(12) United States Patent
Andersson

(10) Patent No.: US 9,359,764 B2
(45) Date of Patent: Jun. 7, 2016

(54) FOUNDATION SPACER

(71) Applicant: Innovativ Plast i Väst AB, Stenkullen (SE)

(72) Inventor: Stefan Andersson, Stenkullen (SE)

(73) Assignee: INNOVATIV PLAST I VÄST AB, Stenkullen (SE)

(*) Notice: Subject to any disclaimer, the term of this patent is extended or adjusted under 35 U.S.C. 154(b) by 0 days.

(21) Appl. No.: 14/427,617

(22) PCT Filed: Sep. 10, 2013

(86) PCT No.: PCT/SE2013/051047
§ 371 (c)(1),
(2) Date: Mar. 11, 2015

(87) PCT Pub. No.: WO2014/042577
PCT Pub. Date: Mar. 20, 2014

(65) Prior Publication Data
US 2015/0218816 A1    Aug. 6, 2015

(30) Foreign Application Priority Data

Sep. 11, 2012 (SE) ........................ 1251020
Jul. 3, 2013 (SE) ........................ 1350832

(51) Int. Cl.
*E04C 5/16* (2006.01)
*B65G 7/12* (2006.01)
*E04C 5/20* (2006.01)

(52) U.S. Cl.
CPC . *E04C 5/168* (2013.01); *B65G 7/12* (2013.01); *E04C 5/20* (2013.01)

(58) Field of Classification Search
CPC ......... E04C 5/166; E04C 5/167; E04C 5/168; E04C 5/20; E04C 5/201; E04C 5/203; E04C 5/205; E04G 21/02; B65G 7/12

USPC .............. 52/346.01, 346.03, 346.04, 346.05; 248/649.8, 677, 684, 685, 686, 687
See application file for complete search history.

(56) References Cited

U.S. PATENT DOCUMENTS 1,979,911 A * 11/1934 Steudel .................. A47G 19/02
                                                         108/91
3,821,426 A *  6/1974 Slone ..................... B65D 25/02
                                                         248/346.01

(Continued)

FOREIGN PATENT DOCUMENTS

AU      2003/200226 A1     9/2003
DE         2556507 A1 *    6/1977 ............... E04C 5/16

(Continued)

OTHER PUBLICATIONS

International Search Report dated Nov. 12, 2013 issued in PCT Application No. PCT/SE2013/051047, filed Sep. 10, 2013.

*Primary Examiner* — Charles A Fox
*Assistant Examiner* — Joesph J Sadlon
(74) *Attorney, Agent, or Firm* — Knobbe Martens Olson and Bear, LLP

(57) ABSTRACT

A stackable foundation spacer is adapted for automated distribution. The foundation spacer includes a lower bearing surface adapted to be placed on a foundation support surface for the concrete, a first support surface adapted to support the reinforcement grid in a plurality of support points, and an outer circumferential side wall connecting the lower bearing surface with the first support surface. The outer circumferential side wall is inclined outwards from the lower bearing surface to the first support surface with an angle α, and the shape of the first support surface is larger than a mesh in the reinforcement grid that is to be supported. Distribution of foundation spacers can be automated by using a hand-held or automatic feeder device. Further, a reinforcement grid can be supported by a foundation spacer regardless of the position of the spacer.

19 Claims, 8 Drawing Sheets

(56) References Cited

U.S. PATENT DOCUMENTS

| | | | | |
|---|---|---|---|---|
| 4,211,327 | A | * | 7/1980 | Stahl et al. ............... 206/505 |
| 4,974,244 | A | * | 11/1990 | Torrisi et al. ............... 378/45 |
| 5,291,715 | A | | 3/1994 | Basile |
| 5,729,949 | A | | 3/1998 | Hartzheim |
| 5,791,095 | A | * | 8/1998 | Sorkin ............... 52/105 |
| 6,282,860 | B1 | * | 9/2001 | Ramirez ............... 52/677 |
| 2010/0024346 | A1 | * | 2/2010 | Strahin ............... 52/699 |
| 2011/0286172 | A1 | * | 11/2011 | Tseng ............... G06F 1/181 361/679.31 |
| 2012/0223032 | A1 | * | 9/2012 | Rothschild et al. ............ 211/41.1 |

FOREIGN PATENT DOCUMENTS

| | | | |
|---|---|---|---|
| DE | 2649345 A1 | 5/1978 | |
| DE | 2821078 A1 * | 11/1979 | ............... E04C 5/20 |
| ES | 1074576 U | 5/2011 | |
| GB | 1272869 A | 5/1972 | |
| SE | 7116444 A | 6/1973 | |
| WO | WO 2010/068995 A1 | 6/2010 | |

* cited by examiner

FOUNDATION SPACER

TECHNICAL FIELD

The present invention relates to a stackable foundation spacer adapted to be used for supporting reinforcement grids in concrete constructions. The stackable spacer is adapted for automated distribution using a feeder device. The size and shape of the spacer is such that it will give reliable support to the reinforcement grid even if the spacers are placed randomly on the ground surface. The spacers can be distributed manually, by the use of a hand-held feeder device or by the use of a semi-automatic or automatic feeder device. Due to the fact that the positioning of the spacers is not critical, a cost-effective spacer is provided. The present invention further relates to a feeder device adapted to distribute such foundation spacers.

BACKGROUND ART

Concrete constructions are normally provided with some kind of reinforcement to increase the strength and to prevent cracking. The reinforcement can be single reinforcement bars (rebars), reinforcement grids or different kinds of fibres or other. Most common are reinforcement grids made from reinforcement bars of steel when larger areas are to be covered. For smaller areas or as a complement to the grids, single reinforcement steel bars are used.

To achieve the required properties in a construction, the reinforcement is placed at different heights. This height creates a concrete cover around the reinforcement in the finished construction. Reinforcement spacers are used to simplify the work of positioning the reinforcement at the prescribed height and to maintain it there through the process until the concrete has burned. The type of spacer used is influenced from e.g. regulations, the surrounding environment, natural resources or aesthetic opinions.

The concrete cover is defined as the smallest distance between the reinforcement material and the concrete surface of the completed construction. A concrete cover which differs from the requirements can negatively affect the strength and life cycle of a construction. The requirements on a concrete cover can be set by national regulations and may vary depending on type of construction and on the surrounding environment. One purpose of the concrete cover is to prevent moisture to reach the reinforcement steel, in order to avoid the negative effects corrosion has on the construction. Corrosion will, through its expansion, slowly break apart the nearby concrete, which causes more moisture to reach the steel which in turn accelerates the corrosion process. Over time this will weakens the construction strength.

To provide support for the reinforcement, reinforcement spacers are used. These are often made from plastic and are designed to facilitate that the concrete fully embraces the reinforcement and the spacers. Air pockets in the final construction must be avoided. Depending on the shape of the spacer, it must be provided with some kind of apertures in order to provide escape ways for air to disappear when concrete is poured upon them.

Reinforcement spacers are made from different materials. Most common are spacers made from plastic, but steel, concrete and other materials are also used. Plastic spacers have several advantages compared to other materials, such as ease of handling, low weight and generally low price, the manufacturing process is fast and spacers can easily be formed to a desired shape. Concrete spacers can be used in most constructions. However, the material makes them heavy and the design makes them more complicated to work with. They are primarily used when plastic is not allowed. Steel spacers are primarily used as spacers inside constructions, e.g. between two layers of reinforcement grids. Steel spacers are seldom used on a ground surface as this will cause corrosion problems.

Depending on the field of application, reinforcement spacers are divided into two main groups, foundation spacers and wall spacers. Foundation spacers are primarily used for positioning reinforcement in foundations/ground plates, while wall spacers are primarily used for positioning reinforcement in walls and vaults. The main difference is the type of underlying surfaces that they are intended to be used on.

Wall spacers are designed with thin legs and/or small feet. The formwork surface is generally hard and even, being a mould, which helps to prevent the spacer to tip over or to cut through the surface. When the formwork is removed, the spacer feet are made visible. At a wall or vault not further processed, these feet will show in the wall surface, which is not desirable. Therefore wall spacers are designed with minimal feet and are also nearly always coloured like the surrounding concrete. Low visibility is a major requirement.

Foundation spacers are designed to be used when the formwork surface is classified as soft and/or uneven, such as a bedding of coarse sand, gravel, grit or other free-draining material or ground. The bearing surface of the spacer towards the ground has a relatively large area and often a large diameter to aid the spacer to stand stable on the ground and not to dig in to the ground or to tip over. Since foundation spacers primarily are used for ground plates and foundations, the spacer will point downward and will not be visible. Foundation spacers thus have no aesthetic significance. It is important that the base plate area of the foundation spacer is large enough not to punch the underlying surface and that it minimizes the risk of the foundation spacer tipping over.

Foundation spacers are divided into two subgroups due to differences in design and the way they are used. One type is referred to as ground spacers. These typically have a large base plate and a smaller support area at the top. Due to the small support area, each spacer has to be placed in an exact position to support any reinforcement. Ground spacers are seen as cheap but time consuming to work with. The other type is linear spacers. They are long and narrow. They support the reinforcement anywhere on its support area lengthwise and no exact positioning is thus required. Due to their length, often 2 meters, they shorten the working time of placing the spacers.

Both these types of foundation spacers are positioned manually on the supporting ground, where ground spacers must be placed with an exact position. Linear spacers are often provided in 2 meter lengths and are often placed next to each other lengthwise. They are relatively heavy.

U.S. Pat. No. 6,775,954 describes a linear foundation spacer comprising three parts that must be assembled before use. AU 2006100538 describes a linear wall spacer, having small feet adapted for the use as wall spacer. A specific base segment can be attached to the feet, such that the spacer can be used as a foundation spacer. U.S. Pat. No. 4,942,714 describes a linear wall spacer. US 2005005564 describes a stackable foundation spacer having an upper receiving section for fixedly retaining of a wire mesh or single reinforcement bars.

DE 2821078 describes a circular wall spacer adapted for producing prefabricated wall modules, where the spacer can be placed randomly on the mould. With a diameter larger than a single square in a reinforcement grid, the spacer will always give support regardless its position. As most wall spacers, the legs and feet are thin, which makes it unsuitable for use on soft underlying formwork surfaces like soil or insulation, such as EPS (extruded polystyrene). The small feet will sink down in the support surface from the weight of the reinforcement and the workers walking upon it, giving an incorrect concrete cover. DE 2809430 also describes a similar wall spacer that can be positioned randomly.

There is thus room for an improved foundation spacer.

DISCLOSURE OF INVENTION

An object of the invention is therefore to provide an improved stackable foundation spacer for supporting a reinforcement grid, and which is adapted for automated distribution. A further object of the invention is to provide a magazine for holding a plurality of such foundation spacers. A further object of the invention is to provide a feeder device for distributing such foundation spacers.

The solution to the problem according to an embodiment of the invention is described in the characterizing part of claim 1 regarding the foundation spacer, in claim 10 regarding the magazine, and in claim 12 regarding the feeder device. The other claims contain advantageous embodiments and further developments of the foundation spacer, the magazine and the feeder device.

In a stackable foundation spacer adapted for automated distribution and adapted to support a reinforcement grid, where the foundation spacer comprises a lower bearing surface adapted to be placed on a ground surface for the concrete, a first support surface adapted to support the reinforcement grid in a plurality of contact positions, and an outer circumferential side wall connecting the lower bearing surface with the first support surface, an advantage according to an embodiment of the invention is achieved in that the outer circumferential side wall is inclined outwards from the lower bearing surface to the first support surface with an angle $\alpha$, and where the shape of the first support surface is larger than a mesh in the reinforcement grid that is to be supported.

By this first embodiment of the foundation spacer according to the invention, a foundation spacer adapted for automated distribution is provided. The foundation spacer is intended to be used to support reinforcement grids in concrete constructions. Due to the size and shape of the foundation spacer, the foundation spacers can easily be filled with and embraced by concrete and they can be positioned randomly and can still support the reinforcement grid. Since the positioning of the spacers is not critical, the distribution of spacers can be made in a time-saving manner using a feeder device. Further, the reinforcement grids must not be attached to the foundation spacers, which also save time. The shape of the foundation spacer allows the spacers to be stacked in each other, which saves space during transportation and storage. Both manual and automated handling of the spacers is also facilitated.

In an advantageous development of the invention, the foundation spacer further comprises a second upper support surface adapted to support the reinforcement grid, and an inner side wall connecting the lower bearing surface with the second upper support surface, where the inner side wall is inclined inwards from the lower bearing surface to the second support surface with an angle $\beta$. In this way, the strength and the stability of the foundation spacer is improved, and the number of possible contact positions for the reinforcement grid is increased. The angle of the inner side wall is preferably the same as the angle of the outer side wall. In an advantageous development of the invention, the outer shape of the foundation spacer is circular. By using a symmetric shape, the handling of the foundation spacer is simplified.

In an advantageous development of the invention, the outer shape of the foundation spacer comprises three semi-circular parts having a dividing angle of 120 degrees. With such a shape, the stability of the foundation spacer is improved. Further, the amount of material required for the foundation spacer is reduced.

In an advantageous development of the invention, the foundation spacer further comprises a central opening which is adapted to be used for the automated distribution of the foundation spacer. The central opening allows a stack of foundation spacers to be inserted onto a hand-held feeder device through the central opening, where the feeder device comprises an elongated body. The foundation spacers can be released one by one by operating a release mechanism in the feeder device.

In an advantageous development of the invention, the first support surface comprises an outwardly extending outer rim. In this way, the strength and stiffness of the foundation spacer is improved. The outwardly extending rim can also be used to facilitate the automated distribution of the foundation spacer cooperating with the release mechanism of the feeder device.

In an advantageous development of the invention, the second support surface comprises an inwardly extending inner rim, which will improve the strength and stiffness of the foundation spacer. The inwardly extending inner rim is arranged adjacent the central opening. The inner rim can also be used to facilitate the automated distribution of the foundation spacer by cooperating with the release mechanism of the feeder device.

In an advantageous development of the invention, the foundation spacer comprises at least one intermediate wall that interconnects the outer side wall with the inner side wall. In this way, the load carrying capacity and the rigidity of the foundation spacer is improved.

In an advantageous development of the invention, the foundation spacer comprises a plurality of ridges on the inner side of the outer and/or inner side wall adapted to support the bearing surface of another foundation spacer when several foundation spacers are stacked. In this way, the foundation spacers will not stick to each other when they are stacked, such that they can easily be separated one by one when they are distributed. Further, a well-defined vertical interval for the stacked spacers is obtained. When the foundation spacer comprises a second upper support surface and an inner wall, ridges with the same height may also be provided on the inner wall, in the direction towards the inner side of the outer side wall.

In an advantageous development of the invention, the foundation spacers are stacked in a magazine. In this way, a plurality of foundation spacers can be handled in an efficient way.

In an advantageous development of the invention, the magazine is adapted to be mounted to a release mechanism, such that one spacer at the time can be released from the magazine. The release mechanism may e.g. comprise a release lever that can be operated by a user carrying the magazine. In this way, a user can release foundation spacers at selected positions in an easy way.

In an advantageous development of the invention, a feeder device for distributing stackable foundation spacers is provided. The feeder device comprises a body for supporting a plurality of stackable reinforcement spacers, a release mechanism for releasing one reinforcement spacer at the time and a handle for holding the feeder device. The release mechanism is preferably hand operated by the user, e.g. by a release lever that is pressed each time a foundation spacer is to be released. The foundation spacers may be provided in a magazine in order to simplify the loading of the feeder.

In one embodiment, the body of the feeder device is longitudinal and is shaped as a rod, which is inserted through the stackable spacers by the use of the central opening. A handle is arranged at the top of the feeder device and is adapted for holding the feeder device with a stack of spacers. The release mechanism is arranged at the opposite end of the feeder device, i.e. at the bottom part of the feeder device. A release grip is arranged at the handle, such that a user can release a spacer at a desired position. In this embodiment, the release mechanism acts on an inner surface of the foundation spacer, preferably at the inner rim. By walking back and forth, foundation spaces can be distributed over the intended foundation area in an easy, ergonomic and cost-effective way.

In another embodiment, the feeder device is provided with wheels and resembles a small cart that can be pulled or pushed by a user. The feeder device is provided with a handle having a release grip in order to release a foundation spacer at a desired position. In this embodiment, the release mechanism acts on an outer surface of the foundation spacer, preferably at the outer rim.

In an advantageous development of the invention, the feeder device is provided with a semi-automatic release mechanism that can release foundation spacers with a predefined interval. The interval is preferably set by a user. In one example, the interval is dependent on the rotation of a wheel of the feeder device, i.e. the interval is dependent on the distance that the feeder device has traveled. The feeder device is preferably semi-automatic and is pulled or pushed manually by a user.

In an advantageous development of the invention, the feeder device comprises a second release mechanism disposed sideways from the first release mechanism, where the first and the second release mechanisms are similar. In this way, two rows of foundation spacers can be distributed at the same time. Both foundation spacers may be released at the same time with the release mechanisms. It is also possible to let the release position of each release mechanism differ by e.g. half the length of the release interval, such that two equal rows with an offset are obtained. It is also possible to let the predefined interval of each release mechanism be set differently, such that two rows with differently spaced foundation spacers are obtained.

In an advantageous development of the invention, the distance between the two release mechanisms can be adjusted sideways such that the distance between two rows of foundation spacers can be set. A suitable adjustment interval for the two release mechanisms is 0.7 to 1.3 meters, but depending on the size of the foundation spacers and the size of the reinforcement grid, other adjustment intervals may be used.

In an advantageous development of the invention, the feeder device is fully automatic and is self-propelled. In this example, the feeder navigates over the work site and positions foundation spacers at predefined positions. The navigation is preferably done by using either a local navigation system positioned at the work site or a differential GPS navigation system.

BRIEF DESCRIPTION OF DRAWINGS

Embodiments of the present invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
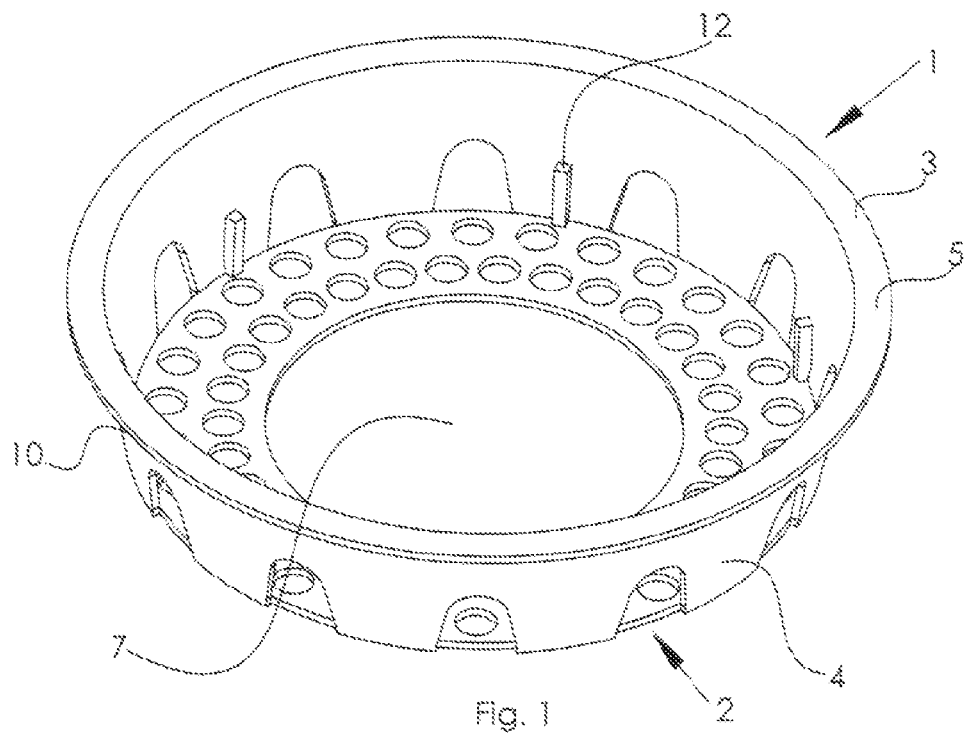
FIG. 1 shows a first embodiment of a foundation spacer according to the invention.

FIG. 1 show a first embodiment of a foundation spacer according to the invention adapted to support reinforcement grids. The foundation spacer 1 comprises a first bearing surface 2 which is adapted to be placed on the ground surface where the concrete is poured. This ground surface may be relatively soft and uneven, usually comprising a bedding of coarse sand, gravel, grit or other free-draining material. The first bearing surface of the foundation spacer must thus be relatively large such that the spacer can stand stable and does not sink into the soft ground surface. The ground surface may also be expanded polystyrene (EPS), which is also relatively soft such that a larger bearing surface is of advantage. The foundation spacer further comprises a first circumferential support surface 3 adapted to support the reinforcement grid in a plurality of positions. The size of the spacer and thus the outer circumferential 10 of the upper support surface is such that it is larger than a mesh in the reinforcement grid. In this way, the foundation spacer can always support the reinforcement grid, regardless of where the foundation spacer is positioned relative the reinforcement grid. An outer circumferential side wall 4 connects the first bearing surface 2 with the first support surface 3. The outer circumferential side wall 4 is inclined outwards from the first bearing surface to the first support surface with an angle α.

The inclination angle of the side wall is preferably within a range of 1-30 degrees, and more preferred 2-15 degrees. In this way, the spacer is easy to produce and several spacers can be stacked in each other, which is a prerequisite for an automated and time-efficient distribution of the foundation spacers. A smaller angle gives a stiffer and stronger spacer. A larger angle may reduce the required material usage.

The outwards inclination of the side wall allows the upper part of the foundation spacer to be larger than the lower part of the foundation spacer. In this way, the reinforcement grid can always be supported and material is saved since the base of the foundation spacer can be made smaller than a mesh of the reinforcement grid. A further advantage of using inclined side walls is that foundation spacers can be stacked in each other, which additionally saves space during transportation and storage. The first bearing surface is provided with a plurality of openings that allows less material to be used and that will strengthen the moulded concrete. The openings allows concrete to flow through in order to fill uneven regions underneath the foundation spacer when the concrete is poured in the mould, which in turn will prevent hollows to form in the concrete mould. The centre of the spacer is here provided with a larger, central opening 7. Also the side walls are preferably provided with openings that let concrete pass through.

The upper support surface 3 is provided with a rim 5 that extends outwards from the side wall 4. The rim will in this example constitute the upper support surface. The outer circumference 10 of the rim thus sets the size of the support surface. The size of the support surface is such that it is larger than a mesh in the reinforcement grid that is to be supported. For a round foundation spacer, as shown in FIG. 1, the outer diameter of the rim is thus larger than the mesh size of the reinforcement grid. When the foundation spacer has another shape, the outer limit of the rim is such that regardless of how the foundation spacer is positioned, it will be larger than a mesh of the reinforcement grid. By securing that the foundation spacer can always support the reinforcement grid without the spacer passing through a mesh, the foundation spacer can be distributed randomly on the ground surface. An exact positioning is thus not required, which saves time. Further, a feeder can be used which distributes spacers semi-automatically or fully automatically, which allows even more time to be saved.

The rim will further increase the support area for the reinforcement grid and will also prevent the reinforcement grid to cut through the support surface and to damage the foundation spacer. The rim should extend around the complete spacer without interruptions.

Since the upper support surface is flat and is situated in one plane and does not comprise any holding means for reinforcement bars, the foundation spacer is mainly intended for supporting reinforcement grids. It is of course possible to use it for support of other types of suitable reinforcement structures as well. The spacer can be randomly placed and will still support reinforcement grids. The foundation spacer is adapted to be used for repairing, renovating and for new constructions of any foundations/ground plates where reinforcement is used, and needs to be elevated from the ground, formwork or other surface regardless of material.

Additionally, the foundation spacer can also be used in other ways, for example between two layers of grids within a foundation or between two layers of grids within a wall element. The foundation spacer is suitable both for manual distribution, where the foundation spacers are placed in position one by one by a user, and for semi-automatic or fully automatic distribution. When they are placed manually, a stack of foundation spacers can easily be carried by the user, either with or without a specific magazine.

The size and design of the foundation spacer allows them to be placed at random positions and still be able to give a good support for a reinforcement grid. There are no regulations that stipulate the required number of spacers needed to support a given reinforcement grid. With the inventive foundation spacer, the exact number of foundation spacers and the exact position of each spacer are not important, since the reinforcement grid is always supported by each spacer. The design and geometry for a spacer may vary, but in order to provide the required functionality and to minimize the used material of the spacer, there are a few important aspects of the invention. To allow a plurality of spacers to be stacked, the outer side wall must be inclined. By using an outward inclination, material is saved since the lower bearing surface can be made smaller than the support surface. The filling of concrete in the foundation spacer is also facilitated. The upper support surface determines the size of the foundation spacer depending on the size of the meshes in the reinforcement grid that is to be supported.

Further, it is of advantage to provide one or more interconnecting walls inside the spacer in order to increase the strength and stability of the foundation spacer, where the interconnecting walls do not prevent the foundation spacers to be stacked.

Figure 2:
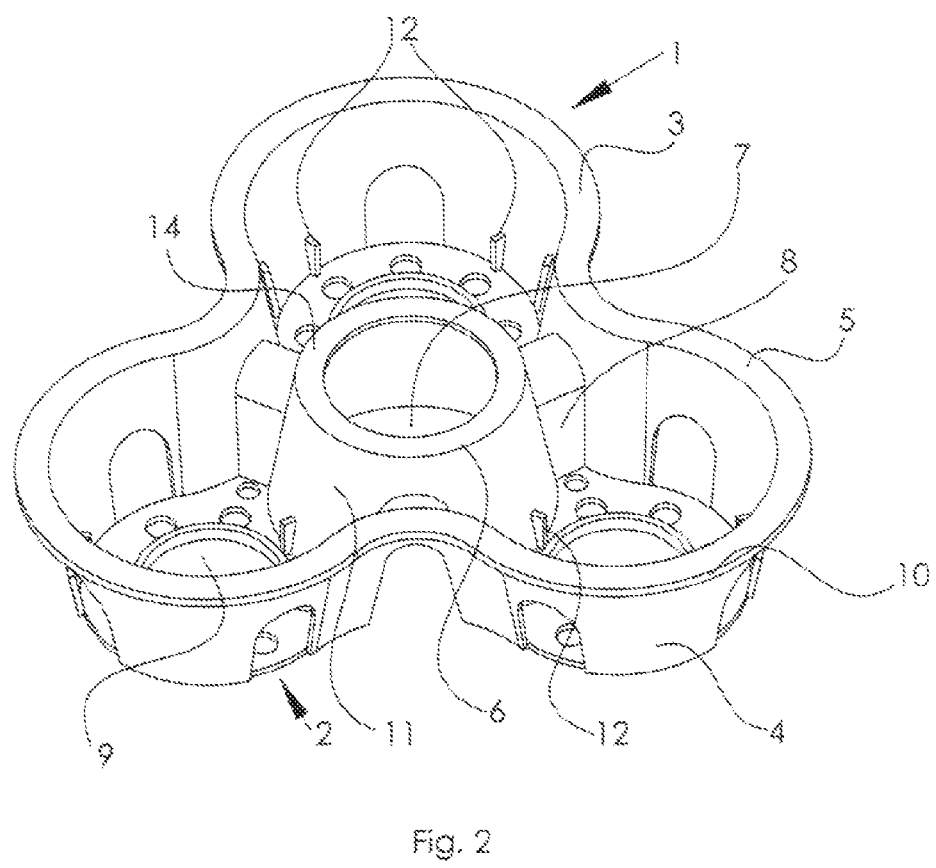
FIG. 2 shows a development of a foundation spacer according to an embodiment of the invention.
Figure 3:
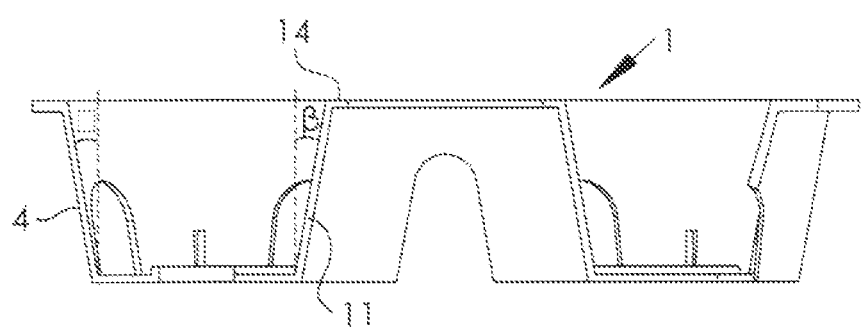
FIG. 3 shows a cut view of the foundation spacer according to FIG. 2.
Figure 4:
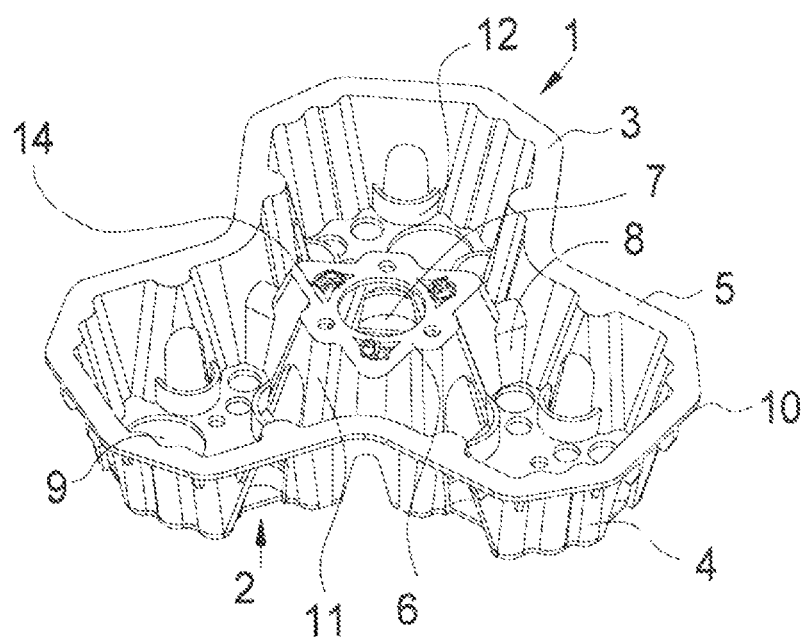
FIG. 4 shows a development of a foundation spacer according to an embodiment of the invention.

In FIG. 2, a development of the foundation spacer is shown, in FIG. 3, a cut section of the foundation spacer of FIG. 2 is shown and in FIG. 4, a further development of a foundation spacer is shown. Here, the outer shape of the foundation spacer comprises three semi-circular parts having a dividing angle of 120 degrees. Other shapes are also possible, but this shape is advantageous in that it provides a plurality of support points for a reinforcement grid. In order to improve the strength of the foundation spacer, and to provide more support points, the foundation spacer is also provided with a second support surface 6. The second support surface is connected with the bearing surface 2 via a circumferential inner side wall 11, which is inclined inwards with an angle $\beta$. The angle $\beta$ may be the same as angle $\alpha$ or may be larger or smaller. Since the inner side wall is inclined inwards, from the bearing surface to the second support surface, it is possible to stack spacers in each other. The second support surface helps to stabilize the foundation spacer and provides a further support surface, such that the weight of the reinforcement grid is distributed on more support points. The second support surface 6 is arranged in the centre of the foundation spacer and is provided with a central opening 7. The second support surface 6 and the central opening 7 may be arranged symmetrically around a centre axis of the foundation spacer, but it is also possible to arrange one or both with an offset from the centre axis.

The second support surface is preferably provided with an inwardly extending inner rim 14 positioned in the centre of the spacer, adjacent the central opening, which enlarges the second support surface. The size of the central opening 7 is preferably adapted to the size of a handheld feeder device, such that the body of the feeder device can fit through the central opening. In this way, the foundation spacers can be held by a feeder device and can be supported by the body of the feeder device. The inwardly extending inner rim 14 may also be offset downwards from the second support surface 6 if the feeder mechanism of the feeder device so requires. The offset distance is preferably the same as the height of the ridges 12, such that the foundation spacers can be stacked.

The inner side wall and the outer side wall are in this example also connected with arched intermediate reinforcement walls 8 which provides further stiffness to the spacer while still being stackable. The shown spacer is provided with three larger openings 9 and several smaller openings. The inner side of the outer side wall may also be provided with small ridges 12 which are adapted to facilitate the stacking of spacers. The height of the ridges are such that the bearing surface of another spacer will stand on the ridges when stacked, which prevents the spacers to stick to each other when they are pushed together. This makes it easier to part the stack of spacers. The ridges further define the spacing in height, i.e. vertical interval, between the spacers. A well-defined vertical interval is advantageous in that it simplifies the feeding of stacked spacers, e.g. from a dedicated magazine or from a feeder device. When the foundation spacer comprises a second upper support surface and an inner wall, ridges with the same height may also be provided on the inner wall, in the direction towards the inner side of the outer side wall.

Since the upper support surfaces 3, 6 of the foundation spacer are flat and are situated in one plane and do not comprise any holding means for reinforcement bars, the foundation spacer is mainly intended for supporting reinforcement grids. The foundation spacers can be randomly placed and will still support reinforcement grids.

The foundation spacers are mainly adapted to be distributed by a feeder device, even if it possible to distribute them by hand by a user. Since the foundation spacer shown in FIGS. 1 to 4 can be placed randomly and must not be positioned exactly, it is time efficient and easy to use. Compared with linear spacers, which is the currently fastest working method for laying foundation spacers, the time for distributing such a stackable foundation spacer can be reduced considerably by using an inventive handheld feeder device.

Figure 5:
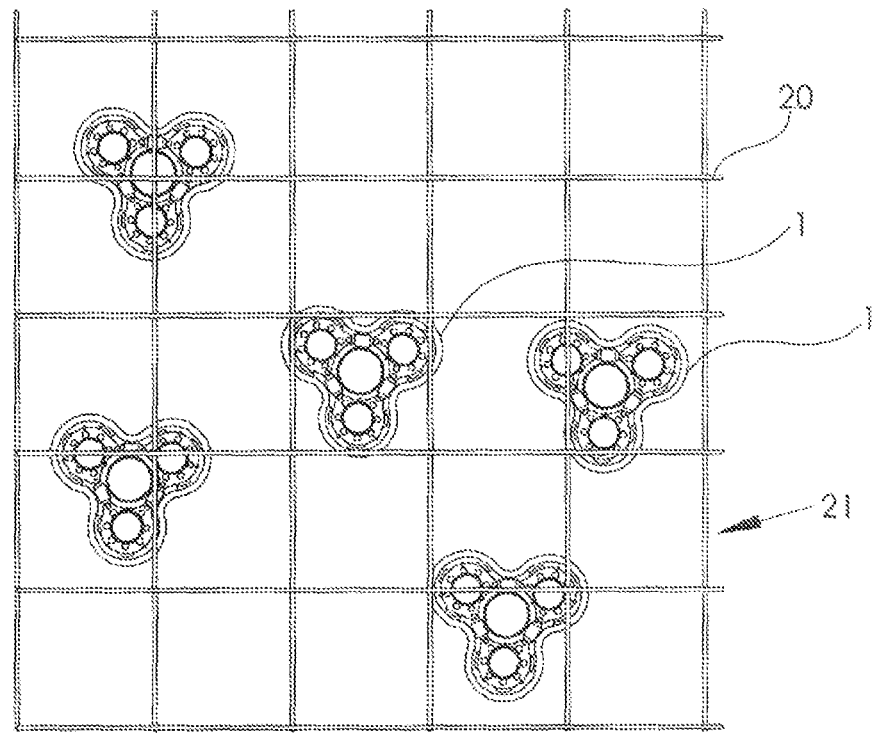
FIG. 5 shows a plurality of foundation spacers according to an embodiment of the invention supporting a reinforcement grid.

FIG. 5 shows a plurality of foundation spacers supporting a reinforcement grid. In this example, the outer shape comprises three semi-circular parts divided with an angle of 120 degrees, as shown in FIG. 2. The outer side wall is still inclined outwards with an angle α. The shape slightly resembles a clover leaf shape. Other shapes are of course also possible, as long as the shape is larger than a mesh in the reinforcement grid that is to be supported. In one example, as shown in FIG. 5, the foundation spacer is intended for a reinforcement grid 20 with a mesh size 21 of 20 cm. The outer shape of the support surface is thus larger than a square of 20*20 cm. In this way, the foundation spacer will always be able to support the reinforcement grid, regardless of how the grid is positioned on the spacer. The reinforcement grid will not be able to fall down due to a misaligned spacer. As can be seen in FIG. 5, a foundation spacer will always support the reinforcement grid at several support points, the reinforcement grid and the foundation spacer will always have several support points, regardless of the relationship between the position of a foundation spacer and the reinforcement grid.

Figure 6:
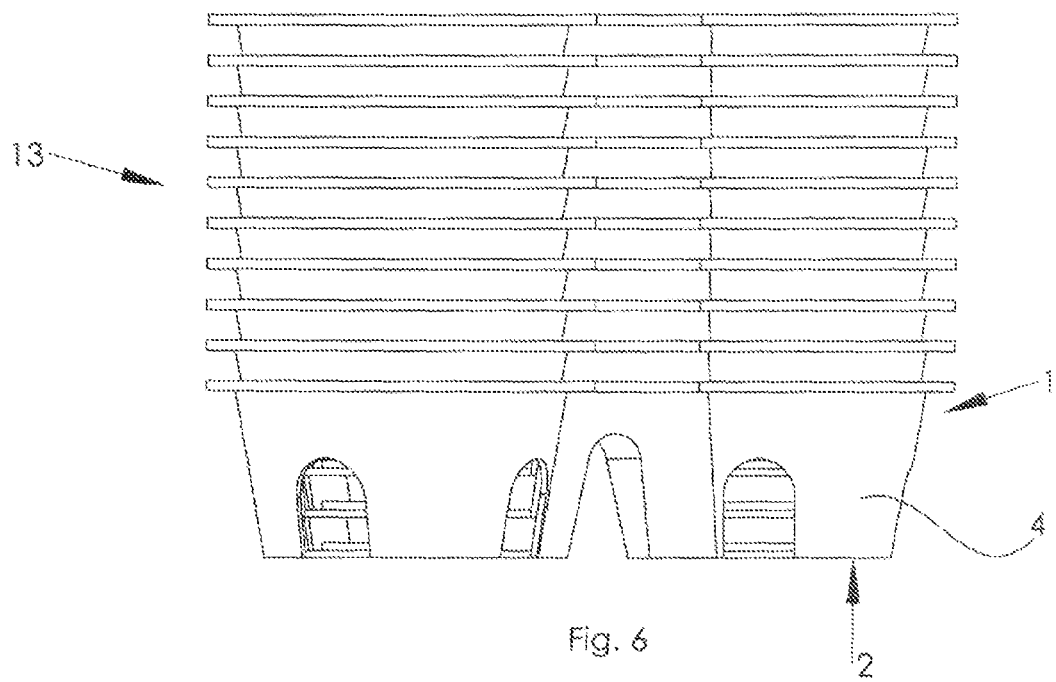
FIG. 6 shows a stack of foundation spacers according an embodiment of to the invention.
Figure 9:
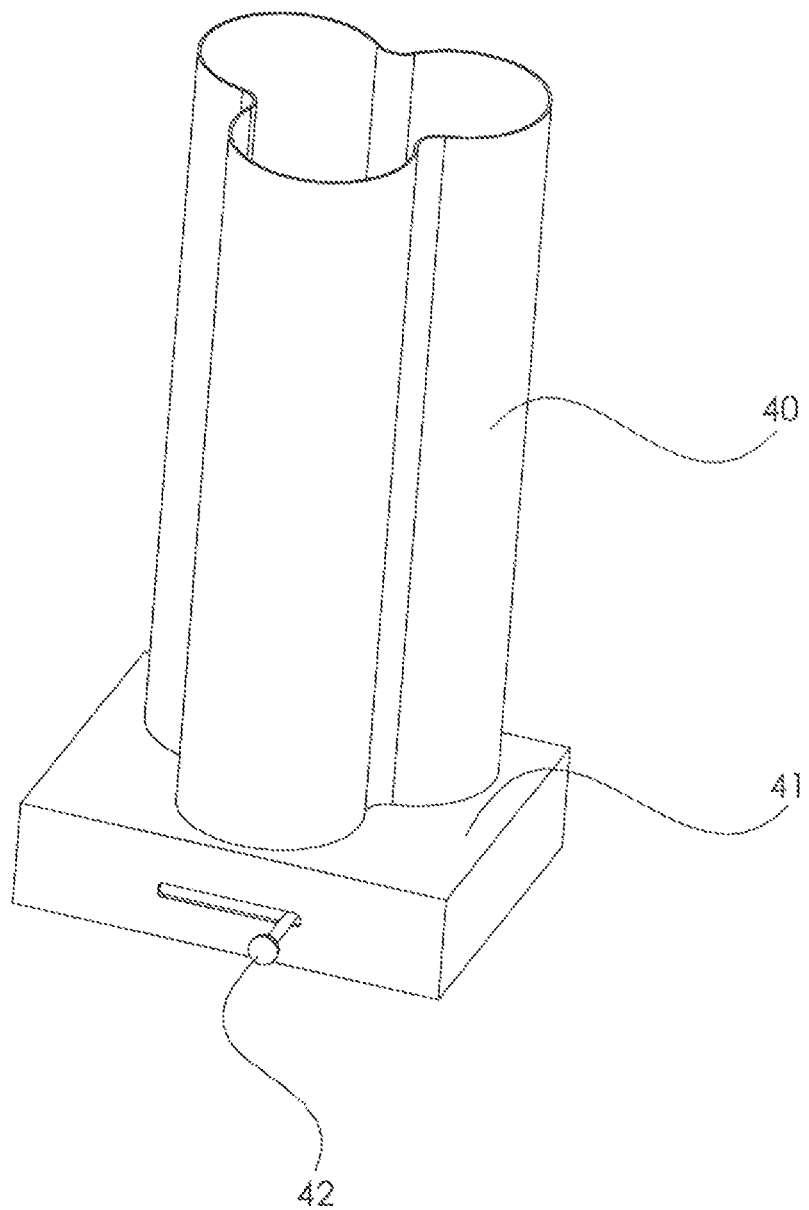
FIG. 9 shows a magazine for foundation spacers according to an embodiment of the invention.

FIG. 6 shows a stack 13 of foundation spacers 1. A stacked pile of spacers saves space during transportation and storage. The spacers may be stacked in a specific magazine, as shown in FIG. 9. The shown magazine 40 is adapted to hold a stack 13 of foundation spacers. The foundation spacers may either be sold and transported in the magazine, or may be placed in the magazine at the work site. The magazine may thus be made from e.g. plastic, cardboard, corrugated fibreboard or even metal, depending on the intended use. It is e.g. possible to use the magazines in a kind of replacement system, where the magazines are filled at a filling station and brought to the work site where the foundation spacers are distributed on the ground surface. The magazines are then returned to the filling station for refilling. In this way, a cost-effective delivery system is obtained. The magazine can further be mounted to a release mechanism 41 which is adapted to release one foundation spacer at the time from the stack of spacers. The release of a foundation spacer can e.g. be done by hand by an operator using a lever 42. In this way, the user can walk around with the magazine and release foundation spacers in the appropriate positions. Since there are no regulations stipulating the exact spacing of the foundation spacers, it is often the experience of the user that decides where the spacers are positioned. By using this type of release mechanism, it can be secured that a reinforcement grid receives appropriate support.

Figure 7:
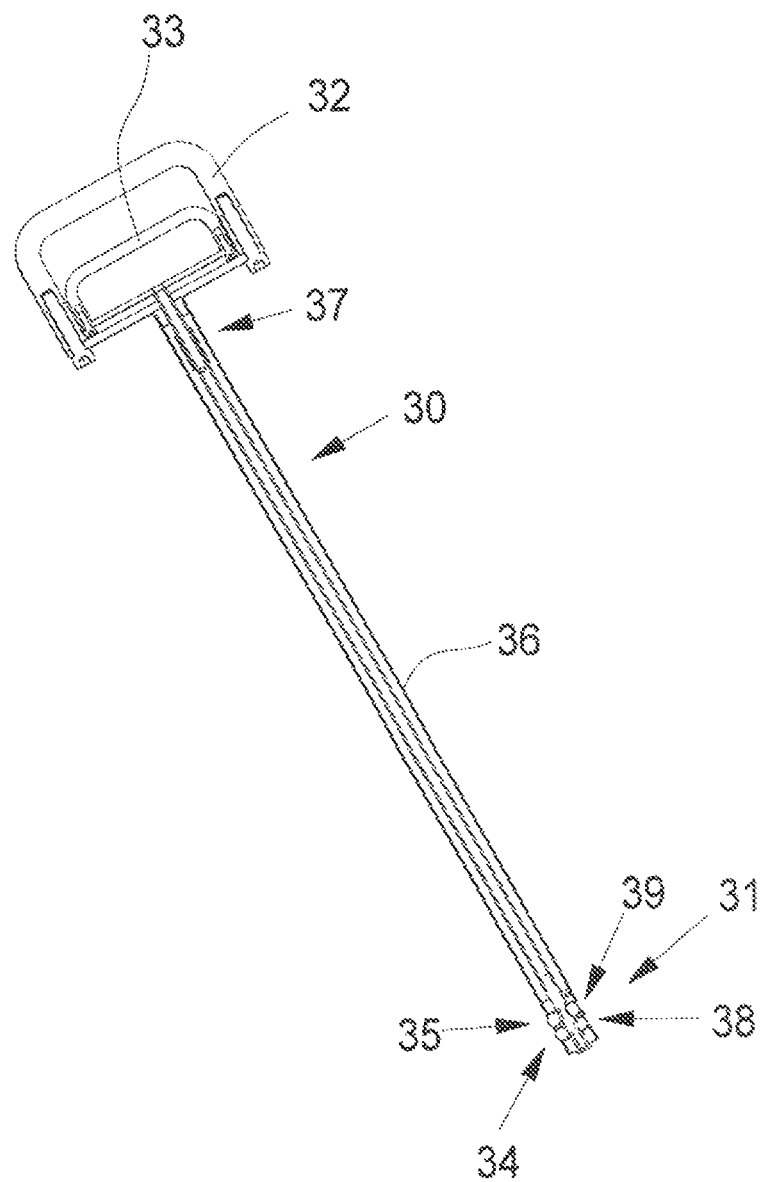
FIG. 7 shows a handheld feeder device according to an embodiment of the invention.
Figure 8:
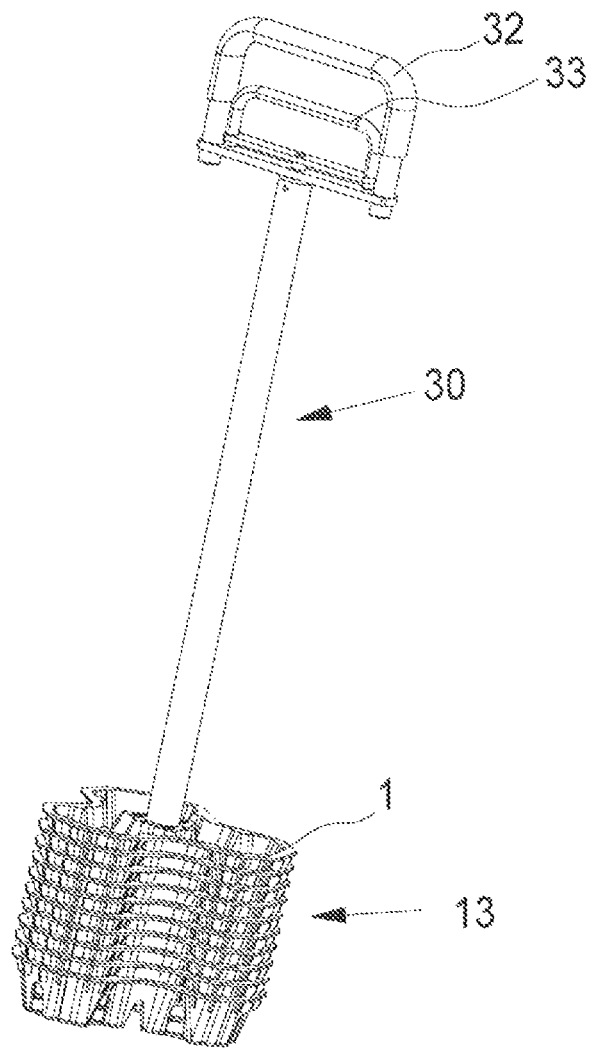
FIG. 8 shows a handheld feeder device according to an embodiment of the invention supporting a stack of foundation spacers.

FIG. 7 show a first embodiment of a handheld feeder device 30 according to the invention arranged to distribute stackable reinforcement spacers, such as foundation spacers. FIG. 8 shows a handheld feeder device with a stack 13 of foundation spacers 1. The shown feeder device 30 is intended to be operated by a user walking around and holding and operating the feeder device with one hand. The feeder device comprises a body 36 which is elongated and may be a rod or a similar element. The outer shape of the body may be circular or may have another shape. Preferably, a suitable shape is symmetrical such as quadratic, hexagonal or octagonal, but other shapes such as triangular or pentagonal are also possible. A symmetric shape is of advantage since the shape of the body should correspond to the shape of the inner central opening 7 of the stackable foundation spacer. A symmetric shape facilitates the loading of spacers on the feeder device.

The feeder device further comprises a release mechanism 31 for releasing one foundation spacer at the time and a handle 33 for holding the feeder device. In the shown example, the feeder device comprises a release grip 32 for operating the release mechanism 31. The feeder device is held in the handle by a user. The user operates the release mechanism by moving the handle and the release grip towards each other. This movement operates the release mechanism 31 at the lower end of the feeder device. It is also possible to operate the release mechanism in other ways. In one example, the release mechanism is spring-loaded and the release mechanism is operated by quickly pulling the handle upwards. This pulling action will overcome the spring force of the spring-loaded release mechanism, which will release a single spacer. In another example, the release mechanism is operated by operating a lever which in turn operates the release mechanism by a wire.

The release mechanism 31 is provided with a first release means 38 and a second release means 39. The first release means 38 and the second release means 39 are similar, and the second release means 39 is arranged above the first release means in a vertical direction. The distance between the first release means and the second release means corresponds to the spacing between two stacked spacers. In this way, a single spacer can be released when the release mechanism is operated. The first release means 38 is arranged at a first position 34 which is adapted to hold either a single spacer or all spacers. The second release means 39 is arranged at a second position 35 which is adapted to hold the remaining stack of plurality of spacers.

The release means 38, 39 protrude outwards from the body when they are in a hold position. In one example, the first release means will protrude outwards such that it will hold all spacers when the release mechanism is idle. When the release mechanism is operated, here by pulling the handle and the release grip towards each other, the second release means 39 will protrude outwards such that the second release means will be able to support the spacers. By operating the release mechanism further, the first release means 38 will retract such that it is aligned with the body and a single spacer is released. The rest of the spacers will now be held by the second release means 39. By releasing the release mechanism, i.e. by releasing the release grip such that the handle and the release grip extend from each other to the idle position, the first release means will protrude outwards such that it will be able to hold all spacers. A return spring 37 is preferably arranged to return the release grip to its idle position. Thereafter, the second release means, holding all the spacers, retract such that all spacers fall down to the first position and that they are held by the first release means.

In another example, the first release means 38 will first retract such that it is aligned with the body when the release mechanism is operated. In this way, a single spacer will be released and can fall down from the first position. By operating the release grip further, the first release means will protrude again, and the second release means will retract such that the stack of spacers is released from the second position. The stack of spacers will fall down such that the first, lowermost spacer in the stack will arrive at the first position and will be held by the first release means. The other spacers will bear on the first spacer until the release grip is released again. A return spring 37 is preferably arranged to return the release grip to its idle position. This will prompt the second release means to protrude again, thereby holding the remaining stack of spacers. The first release means will now only hold the lowermost spacer. By the next operation of the release grip, the single spacer held by the first release means in the first position will be released and the loading of the single spacer is repeated.

When all spacers in the stack of spacers have been released, a new stack of spacers is loaded on the feeder device. This is done by operating the release grip to a feed-in position, in which both release means are retracted or loose at the same time. This allows both release means to align with the outer body surface, such that the feeder device can easily be inserted into a new stack of spacers. When the feeder device is inserted into the stack of spacers, the release grip is returned from the feed-in position such that the stack of spacers is held by the feeding device. The user can now continue distributing spacers.

The feeder device can be designed in various ways. It is however preferred that the release means hold the spacer on an inner support surface, e.g. an inner rim, of the spacer. In this way, a simple and reliable handheld feeder device is obtained. The release means may comprise balls or catches that may be loose or spring-loaded. The operation of the release grip is preferably transferred to the release mechanism by a rod or wire. It is also possible to let the release means be spring-loaded such that they retract when the feeder device is inserted into a new stack of spacers. An advantage of providing the release grip with a feed-in position is that it is also easy to release all spacers at the same time, should the distribution of spacers e.g. be finished or when another size is the be used.

Figure 10:
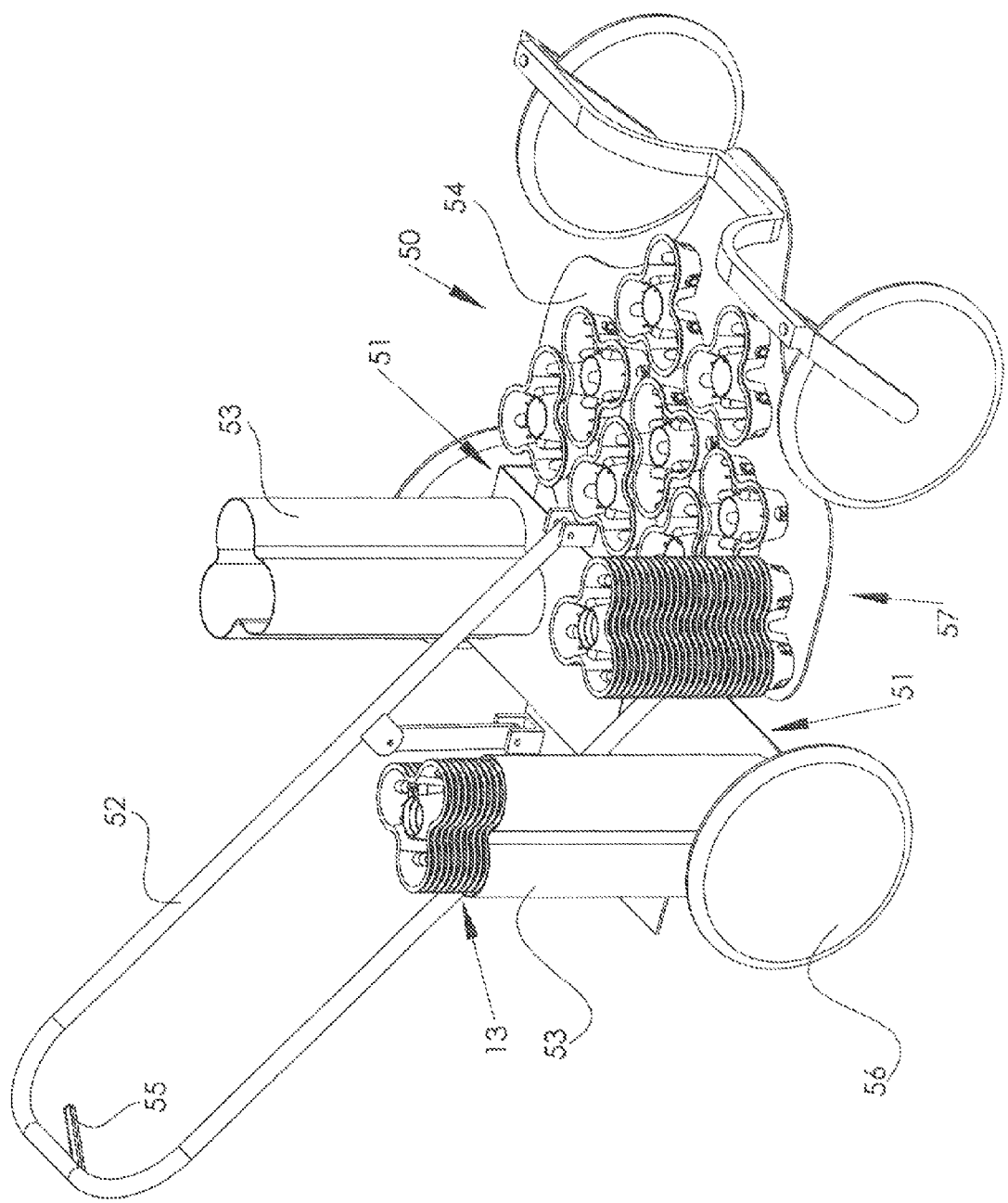
FIG. 10 shows a semi-automatic feeder device for foundation spacers according to an embodiment of the invention.

FIG. 10 shows another example of a feeder device 50 for stackable foundation spacers. The shown feeder device 50 is a semi-automatic feeder which is intended to be operated by a user. The feeder device resembles a wheeled trolley and is provided with a body 57 and at least one release mechanism 51. The release mechanism 51 may consist of the release mechanism 41 mounted to the magazine 40 or may be another type of release mechanism, which is adapted to use the outer rim for holding and releasing the foundation spacers. The user pulls or pushes the feeder device by the handle 52 and the feeder rolls on wheels 56. The foundation spacers may either be released by hand by the use of the release lever 55 or it may be possible to release a spacer at a predetermined interval, such that the spacers are positioned with a predetermined spacing. The distance between the release positions of the feeder device can be set with a dial or the like. In the shown example, the feeder device is provided with two release mechanisms, one on each side of the feeder device. The distance between the release mechanisms can be adjusted such that the sideway spacing of the foundation spacers can be set. A suitable distance for one type of reinforcement grid is in the interval of 0.7-1.3 meters. The stacked spacers 13 are placed in a holder 53 of the feeder device from above. The spacers may be loaded into the holder from a magazine. It is also possible to use a magazine as a holder. The spacers are released downwards from the release mechanism. The feeder device may have two or more wheels, depending on the intended use. The shown feeder device comprises four wheels, but for a manually pulled feeder device, two wheels are sufficient. The shown feeder device is also provided with a storage area 54 provided on the body 57, where additional stacks of spacers can be stored. The spacers are in the shown example released by pulling a release lever 55. It would also be possible to provide the feeder device with several release mechanisms on each side of the feeder, such that one release mechanism can continue to distribute foundation spacers when a first release mechanism is empty. In this way, the reloading of the feeder is simplified.

The release mechanism is in one example connected to the wheels 56 of the feeder device such that the distance between the release positions can easily be set. It is possible to use a mechanic counter directly connected to a wheel, e.g. an axially movable tap that hits a lever on the release mechanism, or to use an electronic rotation sensor in order to obtain the desired distance. After the predetermined distance, the feeder device drops a spacer to the ground.

One advantage of a feeder device is that it reduces the working time for distributing foundation spacers. A further advantage is that it improves the working environment for the user. Normally, the user has to bend down each time a foundation spacer is placed. With a feeder device, the user can walk upright.

It is also possible to let the feeder device be fully automatic, even though a semi-automatic feeder is probably more cost-efficient and saves a lot of time. In this case, the feeder device is self propelled and can be programmed to follow a predefined path, such that spacers can be positioned at predetermined positions at a larger area automatically. The guiding of the automatic feeder device can be governed by e.g. a laser or by a navigation system, such as a differentiated GPS system. With a guiding system, it is also possible to let the feeder device return to a filling station when the feeder device is empty. In this way, the feeder device can be used on very large areas and possibly unattended over night.

It would also be possible to let the feeder device follow a predefined path without an external guiding system, by measuring the rotations of the wheels and using this information to follow the path. Such a simple feeder device guide system would be suitable for well-packed grounds since it cannot compensate for slippage of the wheels.

One way of programming an automatic feeder device is to import a construction drawing into the control system of the feeder device. The control system calculates where to place the spacers and when ready, the user can push the start button and the feeder device starts distributing the spacers at the predetermined positions.

The invention is not to be regarded as being limited to the embodiments described above, a number of additional variants and modifications being possible within the scope of the subsequent patent claims. The foundation spacer may have any size and may be made from any suitable material. Other shapes are also possible.

REFERENCE SIGNS

1: Foundation spacer
2: Lower bearing surface
3: First support surface
4: Outer side wall
5: Outer rim
6: Second support surface
7: Central opening
8: Arched wall
9: Lower opening 10: Outer circumference
11: Inner side wall
12: Ridge
13: Stack of foundation spacers
14: Inner rim
20: Reinforcement grid
21: Mesh
30: Feeder device
31: Release mechanism
32: Release grip
33: Handle
34: First position
35: Second position
36: Body
37: Return spring
38: First release means
39: Second release means
40: Magazine
41: Release mechanism
42: Lever
50: Feeder
51: Release mechanism
52: Handle
53: Holder
54: Storage area
55: Lever
56: Wheel
57: Body

The invention claimed is:

1. Stackable foundation spacer adapted for distribution using a feeder device, the foundation spacer comprising:
   a lower bearing surface adapted to face a foundation support surface for a concrete structure when the spacer is placed over the foundation support surface,
   a first support surface facing a way from the lower bearing surface and adapted to provide support for a reinforcement grid at a plurality of contact positions when the reinforcement grid is placed over the foundation spacer, and
   an outer circumferential side wall interposed between the lower bearing surface and the first support surface,
   wherein the outer circumferential side wall extends outwards from the lower bearing surface when viewed in a direction perpendicular to the lower bearing surface and is inclined with an angle α to the direction, such that the foundation spacer provides a space surrounded by the outer circumferential side wall when viewed from the direction, and configured to receive at least part of outer circumferential side wall of another foundation spacer for stacking foundation spacers, and
   wherein the foundation spacer comprises a central hole, wherein the foundation spacer further comprises a second support surface adapted to support the reinforcement grid, and an inner side wall connecting the lower bearing surface with the second support surface wherein the inner side wall is inclined inwards from the lower bearing surface to the second support surface with an angle β.

2. Stackable foundation spacer according to claim 1, wherein the outer circumferential sidewall of the foundation spacer comprises three semi-circular parts having a dividing angle between each pall of 120 degrees.

3. Stackable foundation spacer according to claim 1, wherein the first support surface comprises an outwardly extending outer rim.

4. Stackable foundation spacer according to claim 1, wherein the second support surface comprises an inwardly extending inner rim.

5. Stackable foundation spacer according to claim 1, wherein the foundation spacer comprises at least one intermediate wall that interconnects the outer side wall with the inner side wall.

6. Stackable foundation spacer according to claim 1, wherein the foundation spacer comprises a plurality of ridges on the inner side of the outer and/or inner side wall adapted to support the bearing surface of another foundation spacer when several foundation spacers are stacked.

7. Feeder device supporting a plurality of stackable foundation spacers according to claim 1 and adapted to distribute the stackable foundation spacers, wherein the feeder device comprises a body for supporting the plurality of stackable foundation spacers through a central hole of the foundation spacers, a release mechanism for releasing one reinforcement spacer at the time and a handle for holding the feeder device.

8. Feeder device according to claim 7, wherein the feeder device comprises a release grip for operating the release mechanism by hand.

9. Feeder device according to claim 7, wherein the release mechanism is spring-loaded and that the release mechanism is operated by pulling the handle upwards in order to overcome the force of the spring force of the release mechanism.

10. Feeder device according to claim 7, wherein the body is a longitudinal rod.

11. Feeder device according to claim 10, wherein the outer shape of the body is circular.

12. Feeder device according to claim 7, wherein the release mechanism is provided with a first release means at a first position and a second release means at a second position.

13. Feeder device according to claim 12, wherein the first release means is adapted to protrude outwards such that it will hold a single spacer and the second release means is adapted to protrude such that it will hold all spacers but one when the release mechanism is in a hold position.

14. Feeder device according to claim 12, wherein the first release means is adapted to protrude outwards such that it will hold all spacer and the second release means is adapted to be retracted when the release mechanism is in a hold position.

15. Feeder device according to claim 12, wherein the distance between the first position and the second position corresponds to the distance between two stacked spacers.

16. Feeder device according to claim 12, wherein the release mechanism is arranged to first retract the first release means such that one spacer is released from the first position, to protrude the first release means and then to retract the second release means such that one spacer is released from the second position to the first position when the release mechanism is operated to release a spacer.

17. Feeder device according claim 12, wherein the release mechanism is arranged to first protrude the second release means such that it will hold all spacers but one at the second position and then to retract the first release means such that a single spacer is released from the first position when the release mechanism is operated to release a spacer.

18. Feeder device according to claim 12, wherein each release means protrudes outwards from the body when a release means holds a spacer.

19. Feeder device according to claim 12, wherein the feeder mechanism is provided with a feed-in position in which both release means are adapted to retract such that they are aligned with the body at the same time.

* * * * *